March 30, 1954 N. MURRAY 2,673,729
SCALE TYPE HOPPER TRUCK
Filed April 5, 1951 2 Sheets-Sheet 1

INVENTOR.
NED MURRAY
BY
ATTORNEY.

March 30, 1954 N. MURRAY 2,673,729
SCALE TYPE HOPPER TRUCK
Filed April 5, 1951 2 Sheets-Sheet 2
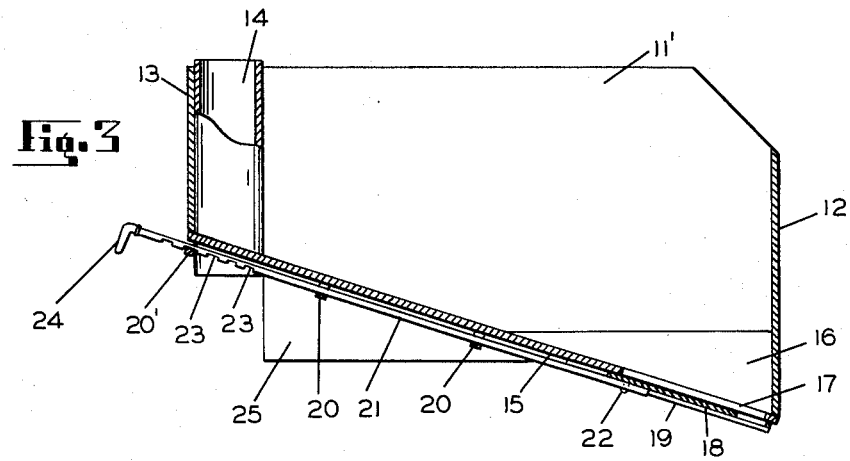
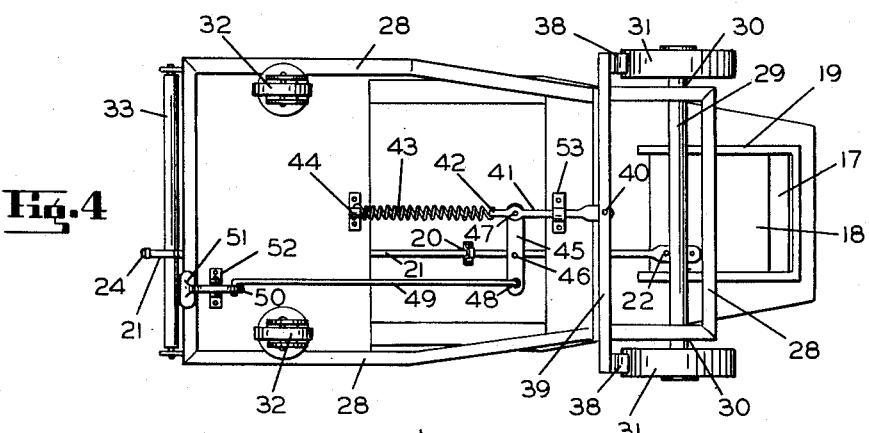
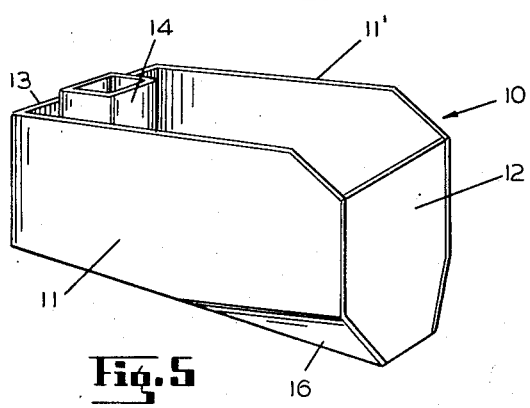
INVENTOR.
NED MURRAY
BY
Christian R. Nielsen
ATTORNEY.

Patented Mar. 30, 1954

2,673,729

UNITED STATES PATENT OFFICE 2,673,729

SCALE TYPE HOPPER TRUCK

Ned Murray, Waupaca, Wis.

Application April 5, 1951, Serial No. 219,402

2 Claims. (Cl. 265—40)

My invention relates to trucks and more particularly to scale equipped hopper trucks for use in the mills and factories.

The object of my invention is to provide a hopper unit, in combination with a conventional type of platform scale, in which the hopper is mounted upon the platform of a scale and in which the scale is supported by a truck member to permit mobile transportation of the entire unit.

Another important object of my invention is to provide a unit in which the hopper is placed onto the platform of a transportable scale in a manner to permit the outlet of the hopper to be sealed with a closure which may be actuated by manual manipulation of a handle located at a site remote from the hopper outlet and near the scale balancing assembly.

It is manifest to anyone familiar with handling of bulk, granular materials, that it is oftentimes imperative that the material be measured by weight, and transported from one place in the warehouse or mill to another.

It is common practice to place the material such as grain in separate containers or bags, which proceedure involves laborious handling and manipulation. The device illustrated, specified and claimed herein provides an open top hopper of large capacity mounted upon the platform of a relatively compact and standard platform scale, making it possible to fill the hopper by means of scoops or shovels so as to place a pre-determined amount of material within the hopper, and to transport the hopper and scale assembly, which contains the material, to a pre-determined station where the contents of the hopper may be unloaded by gravity to a storage bin or conveyor.

Other and further objects of my invention will become more apparent as the description proceeds when taken in conjunction with the drawing constituting a part of this specification and in which:

Figure 3 is a longitudinal cross-sectional view through the hopper assembly,

Figure 4 is a bottom view of the assembled unit illustrating the wheel and brake arrangement, and Figure 5 is a perspective view of the hopper structure.

Figure 1:
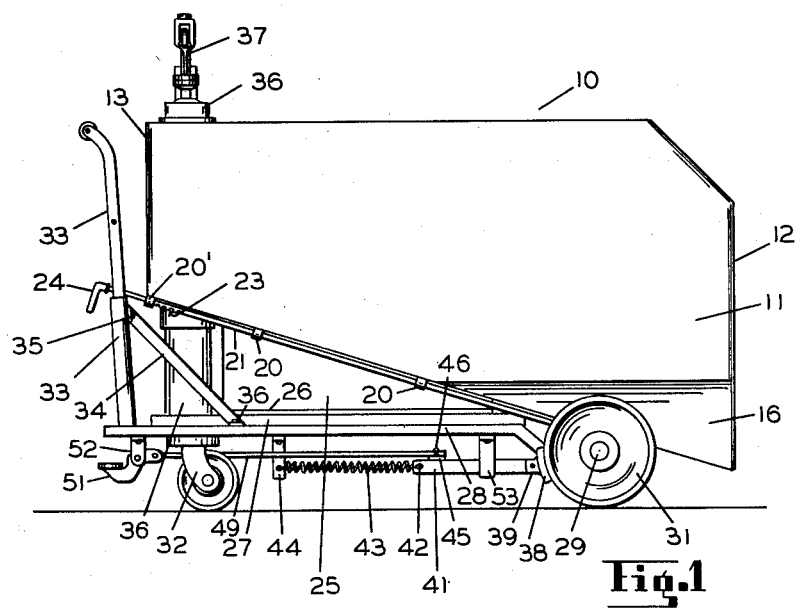
Figure 1 is a side elevation of the entire assembly.
Figure 2:
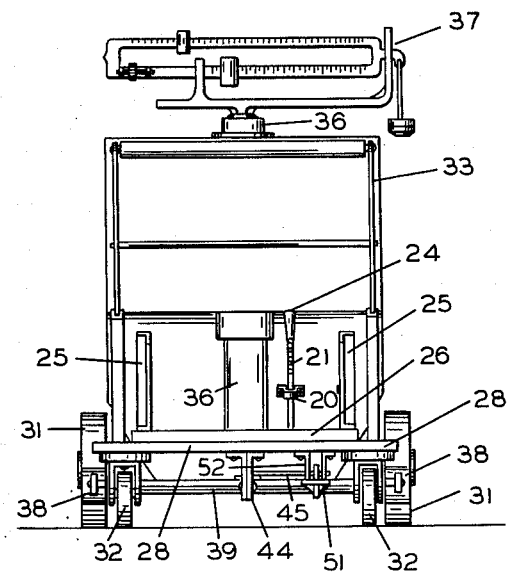
Figure 2 is an end elevation, taken at the left of Figure 1.

Similar characters of reference indicate corresponding parts throughout the several views, and referring now to the same, the character 10, shows a hopper of rectangular shape, however the shape and contour of the hopper may be any desired design. The hopper 10 consists of side walls 11 and 11', a front wall 12, and a rear wall 13. The rear wall 13 has a tubular housing 14 attached thereto which housing extends inward within and upwardly through the enclosure formed by the hopper, and the angularly disposed bottom of the hopper 10, shown as 15, is shaped like a funnel in which the side walls 11 and 11' are tapered inwardly at 16, and the entire bottom 15 slopes towards a lower outlet opening shown as 17 at the forward end of the hopper near its bottom.

There is a closure or slide 18 mounted on channels 19 which are attached to the exterior of the bottom of the hopper, and this slide 18 is disposed within these channels 19, and is movable in opposite directions to open and close the hopper outlet opening 17. There also are guide members 20 which serve as a support for an actuating bar 21 which is attached to the slide 18 at 22, and it is to be noted that the upper end of the bar 21 extends beyond the end of the hopper 10 remote from the outlet opening 17 and which substantially surrounds the tubular housing so as to provide increased storage capacity within the hopper.

The slide manipulating bar 21 is provided with a plurality of notches shown as 23 designed to permit engagement with the guide 20' for positioning the slide 18 at any predetermined position near its relation to the opening 17 in the bottom of the hopper; and the bar 21 is manipulated by means of a handle shown as 24 for the convenience of the operator.

The hopper 10 is shown equipped with a base 25 arranged for engagement with the platform 26 of a scale assembly shown as 27, and this entire scale assembly rests within a portable frame 28 which acts as a truck for the entire assembled device. The truck member or frame 28 has an axle 29 journaled at one end, and on both sides on the frame 28 at 30, and is shown equipped with wheels 31, rotatably mounted on the outwardly extending ends of the axle 29.

The rearward end of the frame 28 is provided with a pair of swivel-type casters 32, and also with a truck transporting handle 33 which is employed for manipulating the entire portable unit. The handle 33 is shown provided with braces 34 for rigidity, and these braces are attached at 35 to the handle and at 35' to the frame 28.

Obviously, the scale assembly 27 has the conventional upwardly extending connection 36 which passes through the enclosure 14 forming a part of the hopper structure, and the member 36 supports a conventional balancing assembly shown as 37 at its upper end and which is located near the closure slide actuating handle 24 in order to permit the operator to manipulate and observe the scale assembly 37, to operate the slide 18, and to advance the truck from a common station.

There are a pair of brake shoes 38 disposed at the outer ends of a transverse equalizer bar 39. These brake shoes are placed in direct alignment with the wheels 31, and are arranged for contact with the outward peripheral surface thereof. The bar 39 is pivotally attached at 40 to a link 41 which is supported at 42 by a resilient member 43 having the rearward end thereof mounted at 44 to the frame 28. A pivoted lever 45 is attached at 46 to the frame 28, and has one of its ends hingedly attached at 47 to the link 41, and the other end at 48 to a longitudinal rod 49 which is pivotally connected at 50 to a foot lever 51, supported by means of a yoke 52 onto the frame 28.

In operation, the entire unit may be moved about on the wheels 31 and the casters 32, as a complete mobile unit with the aid of the handle 33. Normally, the slide 18 seals the opening 17. However, actuation of the bar 21 by means of the grip or handle 24, will permit the slide 18 to open the outlet opening 17, and it may also be retained at any pre-determined position by means of the notches 23 engaging the member 20'. The front wheels 31 may be locked in any fixed position and prevented from revolving by means of the brake shoes 38. When the foot lever 51 is pushed downward, the rod 49 is moved backwards, thereby swinging the lever 45 against the pressure of the resilient member 43, causing the link member 41 sliding within the guide 53 to push the equalizer 39 and thus the shoes 38 will be caused to contact and move towards the surface of the wheels 31.

The device is easy to construct inasmuch as it has the hopper mounted to a conventional platform scale supported by a frame on wheels for mobility. The tubular housing 14 located within the hopper 10 remote from the outlet opening 17, segregates the upwardly extending scale connection 36 from the material stored within the hopper while still permitting the hopper to be formed of large capacity and applied to a relatively small standard platform scale. The location of the handles 24, 33 near the scale balancing assembly 37 and remote from the hopper outlet opening 17, enables a single operator to conveniently, safely and effectively manipulate the entire unit from a common site without moving around the hopper 10. The portable scale type hopper truck is simple in construction and highly efficient for the purpose for which it is intended, and although I have shown a specific arrangement of the component parts constituting the device, I am fully cognizant of the fact that the arrangement of the parts may be varied without affecting their operativeness, and without departing from the spirit of my invention or the scope of the appended claims.

Having thus described my invention, what I claim and desire to secure by Letters Patent in the United States is:

1. In a scale type hopper truck, a transportable scale having a lower floating platform and a balancing assembly disposed above and operatively associated with the platform by an upwardly extending connection, an upwardly open hopper carried by said platform and having an outlet opening near one end and a bottom sloping toward said opening, said hopper also having therein a tubular upwardly extending housing located at the end remote from said opening through which said scale connection extends and which is formed to segregate said connection from the material storage space within the hopper, and a closure for said hopper outlet opening having a manipulating handle near the end of said hopper remote from said opening and near said scale balancing assembly.

2. In a scale type hopper truck, a truck having a transporting handle at one end, a scale mounted upon said truck and having a lower floating platform and a balancing assembly disposed above and operatively associated with the platform by an upwardly extending connection, an upwardly open hopper carried by said scale platform and having a lower outlet opening near the end of said truck remote from said transporting handle, said hopper also having a tubular housing for said scale connection located at the end remote from said opening and extending upwardly therethrough and formed to segregate said connection from the material stored within the hopper, and a closure slide for said hopper outlet opening guided for reciprocation along the bottom of said hopper and having a manipulating handle located near said scale balancing assembly and within easy reach of said truck transporting handle.

NED MURRAY.

References Cited in the file of this patent

UNITED STATES PATENTS

| Number | Name | Date |
| --- | --- | --- |
| 110,100 | Wilcox | Dec. 13, 1870 |
| 925,282 | Bradford | June 15, 1909 |
| 934,831 | Parker | Sept. 21, 1909 |
| 1,559,796 | Shuey et al. | Nov. 3, 1925 |
| 1,602,339 | Davidson | Oct. 5, 1926 |
| 2,287,133 | Reiter | June 23, 1942 |
| 2,591,785 | Crawford et al. | Apr. 8, 1952 |